A. DISTLER.
FRUIT DRIER.
APPLICATION FILED APR. 30, 1913.
1,118,272.
Patented Nov. 24, 1914.
2 SHEETS—SHEET 2.
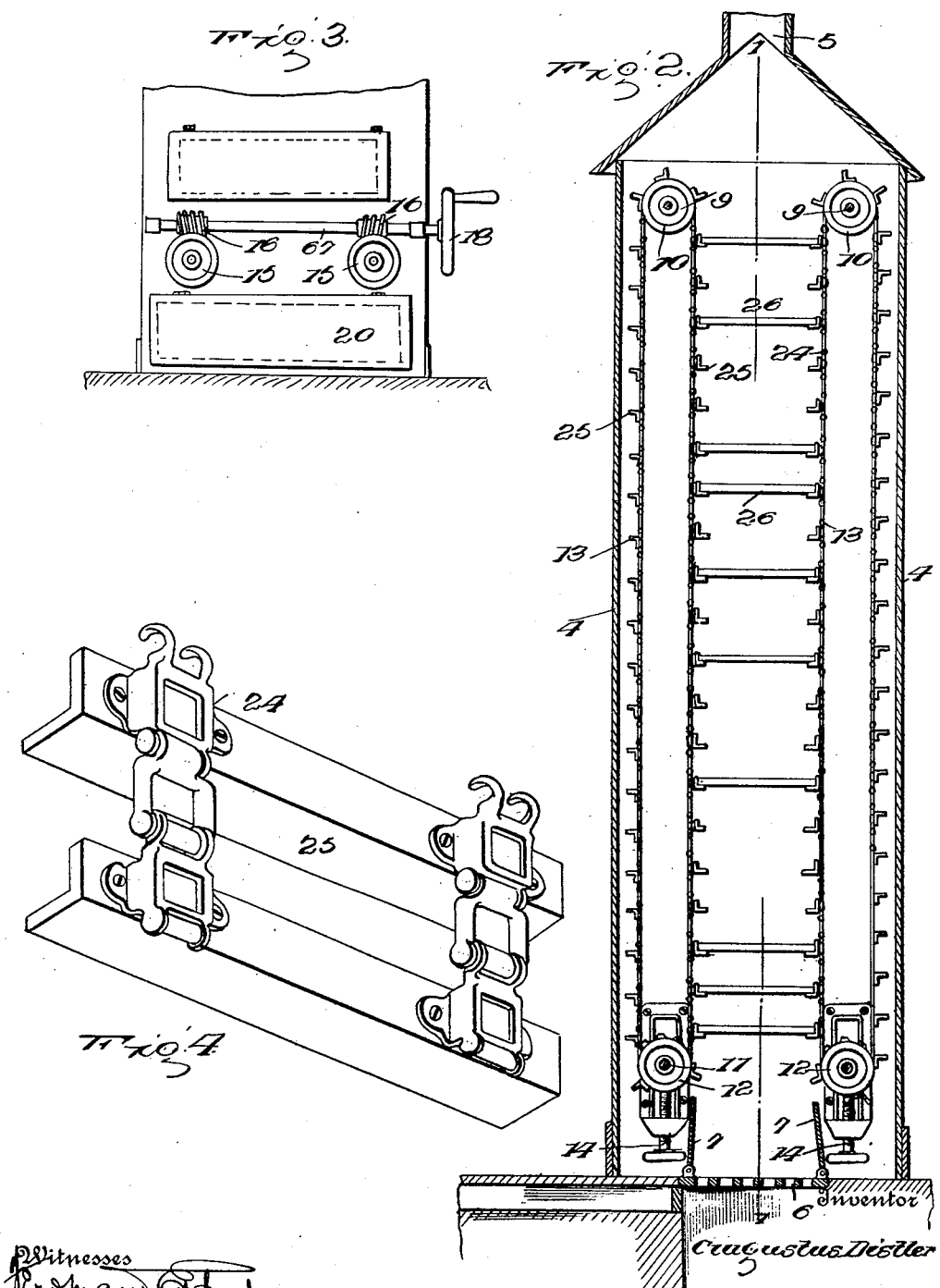

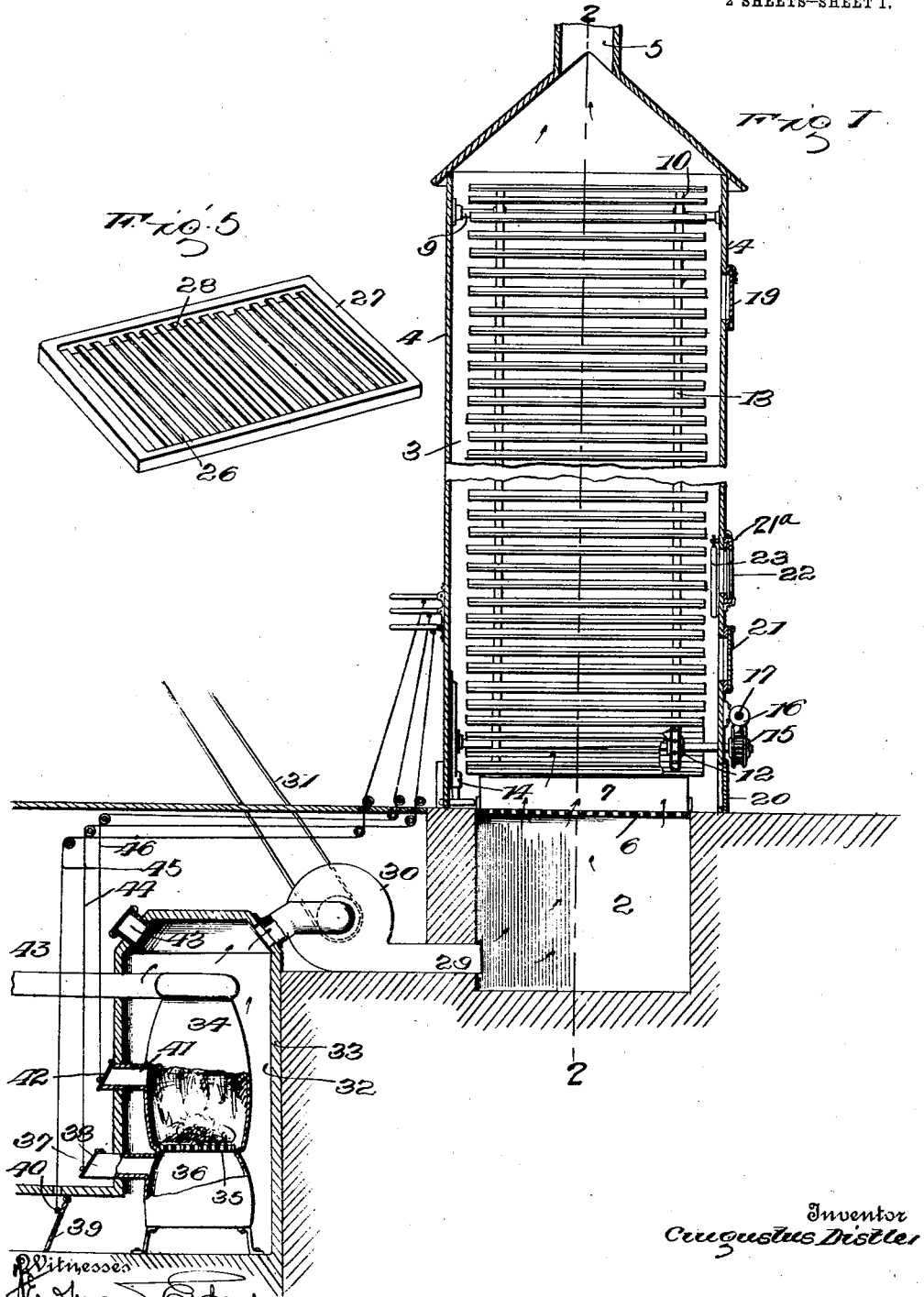

UNITED STATES PATENT OFFICE.

AUGUSTUS DISTLER, OF NORTH YAKIMA, WASHINGTON.

FRUIT-DRIER.

1,118,272.     Specification of Letters Patent.      Patented Nov. 24, 1914.

Application filed April 30, 1913. Serial No. 764,601.

*To all whom it may concern:*

Be it known that I, AUGUSTUS DISTLER, citizen of the United States, residing at North Yakima, in the county of Yakima and State of Washington, have invented certain new and useful Improvements in Fruit-Driers, of which the following is a specification.

My invention relates to means for drying fruit or like materials, and particularly to that class of driers in which the fruit is carried through a drying chamber and subjected to the use of hot air.

The primary object of my invention is the production of a simple, efficient and easily operated drier of the character above referred to, and a further object in this connection is to provide means whereby the operator may have full control of the fruit contained within the drying chamber, so that the fruit may be passed more or less rapidly through the drying chamber, as the exigencies of any particular case may require.

A further object is to provide means whereby the trays containing the fruit may be easily placed within the drier and easily removed therefrom. In this connection the elevator or conveyer is of such form as will readily receive the trays and so support the trays that the hot air may have access to the fruit to a maximum degree.

A further object of the invention is to provide means whereby the operator may have fuller control of the temperature in the heating chamber, and a further object of the invention is to so construct the drier that a constant supply of hot air may be delivered to the heating drying chamber when desired and for any period needed.

A still further object of the invention is to so construct the heating chamber that dust, ashes, etc., may be excluded from the heating chamber when the heating furnace is not operated, and in this connection provide means whereby the hot air from the heating chamber may be directed directly into the chamber.

Other objects will appear in the course of the following description.

My invention is illustrated in the accompanying drawings, wherein:—

Figure 1 is a vertical section on the line 1—1 of Fig. 2. Fig. 2 is a vertical section on the line 2—2 of Fig. 1. Fig. 3 is a fragmentary side elevation of the lower portion of the drier. Fig. 4 is a perspective detail view of a portion of the tray-supporting chain. Fig. 5 is a view of one of the trays removed.

Corresponding and like parts are referred to in the following description and indicated in all the views of the accompanying drawings by the same reference characters.

Referring to these drawings, 2 designates the hot air vault whose walls may be formed of brick, concrete or any other suitable material resting upon a suitable foundation. Disposed upon this vault and extending upward therefrom is a drying chamber designated generally 3, this chamber being formed with walls 4. The upper end of this chamber is provided with the damp air outlet 5 and the lower portion of the chamber is separated from the hot air vault 2 by means of a grate 6. Disposed above the grate 6 are the oppositely disposed doors 7 which may be turned down in position to lie over and close the passage through the grate or may be turned up to a vertical position so as to permit the hot air from the hot air vault to pass into the chamber 3. Passing transversely through the upper portion of the chamber adjacent the top thereof are shafts 9. These are transversely spaced from each other and carry each a pair of sprocket wheels 10. Disposed in the lower portion of the chamber adjacent the grate 6 are oppositely disposed transversely extending shafts 11 which are placed in alinement to the shafts 9, each shaft carrying thereon the sprocket wheels 12 corresponding in position to the sprocket wheels 9. These sprocket wheels are for the purpose of carrying the endless conveyer chains 13. There are a pair of these chains on each side of the heating chamber and the detailed construction of these chains will be later stated. The shafts 11 and the sprocket wheels carried thereon are connected to chain tighteners designated 14, whereby the chains 13 may be kept taut. These chain tighteners may be of any suitable construction.

Each of the shafts 11 project out through the side walls of the chamber 3 and each shaft is provided with a toothed worm wheel 15 adapted to be engaged by a corresponding worm-gear 16 on a shaft 17. This shaft is provided with a hand-wheel 18 and constitutes the means whereby the shafts 11 are actuated to carry the conveyer chains 13 in a closed path. It will be seen that both the conveyer chains are actuated synchronously so that the trays supporting the fruit will be carried up or down evenly within the heating or drying chamber.

One wall of the drying chamber is provided near its upper end with the door 19 which is disposed adjacent the upper end of the conveyer formed by the chains 13 and it is through this door that the fruit may be placed within the drying chamber. The lower end of the casing 3 or chamber is provided with a door 20 whereby access may be had to the mechanism on the inside of the chamber. Above this door 20 and above the level of the shaft 17 there is a door 21 through which the operator removes the fruit after it has been dried. Above the door 21 there is disposed a small door 21ª which may be opened to permit the operator to test the fruit to see that it is properly dried. Formed in the door 21ª is a small glass door or pane 22 through which a thermometer 23 may be observed by the operator in order that he may be able to regulate the temperature of the drying chamber and maintain this temperature at all times.

The chain 13 is made up of chain links 24 of any suitable description but preferably that form of link known as a "slat" link. Tray-holders 25 are riveted to the links 24, these tray-holders being made of light angle iron. I have found in practice that these tray-holders will be in ordinary fruit driers made up of 2x2 angle irons, each three feet and six inches in length. These tray holders it will be observed provide projecting ledges or flanges which extend out perpendicularly to the flight of the chain and are adapted to support fruit trays 26. These fruit trays in the construction illustrated are 3ft.x3ft. and six inches long formed by an outside rim 2x2 of wood strips 27 and provided with a bottom made up of slats 28. The trays are made so that either side may be used to support the fruit.

The lower portion of the hot air vault 2 is formed with an inlet 29 and connected with this inlet 29 is a blower 30 which may be driven in any suitable manner by means of a belt 31. Operatively connected to this blower is a furnace or heater designated generally by the numeral 32. This heater may be of any suitable character, but as illustrated comprises an outer casing 33 and a furnace proper 34. The furnace is formed at its lower end with a grate 35, below which is the ash-pit 36. The cold air may be introduced into the ash-pit by means of a cold air inlet 37 controlled by the draft door 38. Cold air may be let into the casing surrounding the furnace by means of an inlet 39 controlled by an inlet door 40. The furnace 34 is also provided with the draft flue 41 controlled by a door 42 and the upper portion of the furnace is provided with the outlet flue 43. The doors 38, 39 and 42 are controlled, respectively, by means of chains 44, 45 and 46 connected to suitable actuating devices, not shown, whereby the chains may be shifted and the draft doors held in any desired position.

The blower 30 draws air from the hot air furnace 32 through the hot air pipe and forces air into the hot air vault 2 at the bottom of the vault, thus causing a uniform and regular circulation of air in the hot air vault and forces the hot air upward through the hot air grate 6 and into the chamber 13. The hot air grate 6 is formed of material having relatively small perforations or reticulations which causes a uniform distribution of hot air within the drying or heating chamber 3. As the only outlet from the chamber 3 is by way of the outlet 5 at the upper end thereof and as the hot air is forced inward from below, it necessarily follows that this hot air must pass up the entire height of the chamber 3 and thus come in contact with all of the fruit carried upon the trays. It is to be noted in this connection that the blower 30 causes a positive circulation of this hot air so that the hot air passes through the chamber 3 relatively quickly and does not merely flow through sluggishly as it would otherwise do. As a consequence, the hot air exerts its maximum drying power upon the fruit and takes up the moisture therefrom. Furthermore it is to be noted that the fruit trays pass downward through the chamber 3 at a relatively slow speed so that the fruit on each tray is subjected to the desiccating action of the hot air for a considerable period of time.

It is not intended in this apparatus that all of the fruit should be inserted or removed at the same time, although of course the apparatus might be used in this manner, but it is intended that the tray shall be removed successively from the lower portion of the casing and that there shall be an interval between the removal of one tray and the removal of the next succeeding tray so that there may be a considerable period of time between the placing of the fruit in the top of the casing or chamber and removal of the fruit from the bottom.

The period during which the fruit is subjected to the action of hot air is of course regulated by the operator who may drive the conveyer formed by the chains 13 at any desired speed. He may place a number of trays at the top of the casing or chamber and remove two or three from the lower part of the casing simultaneously, or he may insert or remove the trays one by one.

The blower 30 is a very important part of my invention. Long practical experience has shown me plainly the necessity of a blower in order to secure a proper circulation of hot air within the fruit drying chamber. One of the difficulties to be encountered in the proper drying of fruit is the preservation of the proper temperature and securing an even distribution of heat so that the lower part of the fruit drier will not be warmer than the upper part thereof. When no blower is used in order to secure a proper draft of the hot air through the fruit drier, it is necessary that very hot fires be kept up. This very often leads to the ignition of the fruit drying plant and, furthermore, this intensely warm air will tend to scorch the fruit. Furthermore, it oftentimes happens that it is impossible to secure a proper draft, even though a high heat be kept in the furnace and that under these circumstances it is necessary for fruit drying plants to shut down. By the use of the blower, I positively force the heated air into the fruit drying chamber and compel this heated air to pass up through the chamber and out through the outlet thereof. By interposing between the chamber and the blower the chamber 2, I temper this hot air so that it will not scorch the fruit. Were the hot air to be carried directly into the chamber, it would be liable to either over dry the fruit or scorch it. The hot air as it leaves the furnace "stings" the fruit. The chamber 2 tempers the hot air before it reaches the fruit itself. Fruit dried in any drier is evenly dried and is not chippy and tough. My improved fruit drier occupies relatively small space, is more conveniently operated than driers known to me and dries the fruit more quickly and evenly than other driers known to me. The operator has full control of the heat and can regulate this heat by admitting more or less cold air. By noting the condition of the fruit he can regulate the operation of the endless conveyers carrying the trays so that the fruit may neither be under dried nor over dried.

While I have illustrated what I have deemed to be the preferred form of my invention, I do not wish to be limited thereto as it is obvious that many changes might be made in the details of construction without departing from the spirit of invention.

I have illustrated the furnace and the hot air chamber 2 as being disposed below the floor A, this floor being supported by beams B mounted upon the walls of the hot air vault 2. Of course this arrangement is open to many modifications.

What I claim is:—

1. A fruit drier including a hot air vault, an air heater, means for forcing hot air into the vault, a vertically disposed drying chamber, means in said chamber for supporting fruit, a reticulated screen disposed between the vault and the chamber, and doors adapted to be closed down on said screen or turned up in a vertical direction.

2. In a fruit drier of the class described, a drying chamber, means for forcing hot air into the lower portion of the chamber and carrying off the hot air at the upper portion thereof, and oppositely disposed, vertically movable conveyers mounted in said chamber, said conveyers comprising links connected to each other to form endless chains, and transversely extending angle irons mounted upon said links, the horizontal flanges of said angle irons being adapted to support fruit trays.

3. In a fruit drier of the class described, a vertically disposed drying chamber open at its upper end, a hot air tempering vault disposed below the chamber, an air heater separated from the vault, means for forcing the air from the heater into the vault, means disposed between the vault and the drying chamber for impeding the passage of air from the vault into the drying chamber and for diffusing the hot air within the chamber, oppositely disposed vertically movable conveyers mounted in said chamber, said conveyers including endless elements, fruit supporting members mounted on said endless elements and traveling therewith, means disposed on the exterior of the chamber for operating said conveyers to thereby cause the fruit to travel downwardly from the upper portion of the chamber to the lower portion thereof, and means also disposed upon the exterior of the chamber for controlling the heating means.

In testimony whereof I affix my signature in presence of two witnesses.

AUGUSTUS DISTLER. [L. S.]

Witnesses:
D. HARVEY FRY,
FRED. E. SHAW.